(12) United States Patent
Johnson

(10) Patent No.: US 9,942,731 B2
(45) Date of Patent: Apr. 10, 2018

(54) RADIO ALERT SYSTEM AND METHOD

(71) Applicant: OTTO ENGINEERING, INC., Carpentersville, IL (US)

(72) Inventor: Mark J. Johnson, Cary, IL (US)

(73) Assignee: OTTO ENGINEERING, INC., Carpentersville, IL (US)

( * ) Notice: Subject to any disclaimer, the term of this patent is extended or adjusted under 35 U.S.C. 154(b) by 0 days.

(21) Appl. No.: 15/165,232

(22) Filed: May 26, 2016

(65) Prior Publication Data
US 2016/0352545 A1 Dec. 1, 2016

Related U.S. Application Data

(60) Provisional application No. 62/167,107, filed on May 27, 2015, provisional application No. 62/174,657, filed on Jun. 12, 2015.

(51) Int. Cl.
*H04B 7/00* (2006.01)
*H04W 4/10* (2009.01)
*H04L 5/14* (2006.01)

(52) U.S. Cl.
CPC ............. *H04W 4/10* (2013.01); *H04L 5/143* (2013.01); *H04L 5/1492* (2013.01)

(58) Field of Classification Search
CPC . H04W 84/18; H04M 2250/12; H04N 5/3415
USPC ....................... 455/41.2, 41.3, 507
See application file for complete search history.

(56) References Cited

U.S. PATENT DOCUMENTS

| 5,109,526 | A | * | 4/1992 | Reed | H04W 88/02 455/11.1 |
|---|---|---|---|---|---|
| 5,455,968 | A | * | 10/1995 | Pham | H03F 1/34 330/136 |
| 5,721,771 | A | * | 2/1998 | Higuchi | H04M 9/082 379/388.02 |
| 6,125,207 | A | * | 9/2000 | Merchant | G08B 5/226 358/426.04 |
| 6,266,515 | B1 | * | 7/2001 | Hazama | H04B 1/44 455/517 |
| 6,400,935 | B1 | * | 6/2002 | Williams | H04B 1/1027 331/25 |
| 6,751,474 | B1 | * | 6/2004 | Lin | H04L 29/06 375/222 |
| 2002/0084918 | A1 | * | 7/2002 | Roach | G08G 1/205 340/988 |
| 2004/0014445 | A1 | * | 1/2004 | Godsill | G10L 15/20 455/226.1 |
| 2006/0029212 | A1 | * | 2/2006 | Short | H04M 1/6008 379/388.03 |

(Continued)

*Primary Examiner* — Dominic Rego
(74) *Attorney, Agent, or Firm* — McAndrews, Held & Malloy, Ltd.

(57) ABSTRACT

Various embodiments include a system and method that automatically communicate data using a nonlinear, time-varying voice channel. The system may include one or more sensors, a controller, and a radio transmitter. The one or more sensors may be operable to detect a condition. The controller may be configured to receive an indication of the detected condition from the at least one sensor. The controller may be configured to generate a message including information of the detected condition based on the received indication of the detected condition. The radio transmitter may be configured to wirelessly transmit the generated message on the voice channel.

21 Claims, 1 Drawing Sheet

(56) References Cited

U.S. PATENT DOCUMENTS

| | | | |
|---|---|---|---|
| 2006/0098629 A1* | 5/2006 | Watanabe | H04M 1/72555 370/352 |
| 2006/0154209 A1* | 7/2006 | Hayman | A61C 19/00 433/215 |
| 2007/0079205 A1* | 4/2007 | Jeng | G01R 31/2848 714/741 |
| 2007/0139192 A1* | 6/2007 | Wimberly | G08B 13/19656 340/539.22 |
| 2007/0263847 A1* | 11/2007 | Konchitsky | G10L 21/0208 379/392.01 |
| 2008/0102873 A1* | 5/2008 | Kumar | H04W 52/146 455/522 |
| 2008/0272918 A1* | 11/2008 | Ingersoll | A61B 5/0002 340/573.1 |
| 2009/0175220 A1* | 7/2009 | Yi | H04B 7/0602 370/328 |
| 2009/0196429 A1* | 8/2009 | Ramakrishnan | H04R 3/005 381/26 |
| 2010/0067572 A1* | 3/2010 | Mori | H04N 19/61 375/240.01 |
| 2010/0247099 A1* | 9/2010 | Lowery | H04B 10/2543 398/79 |
| 2012/0263141 A1* | 10/2012 | Taghavi Nasrabadi | H04W 72/02 370/330 |
| 2013/0195459 A1* | 8/2013 | Shieh | H04L 27/2614 398/79 |
| 2013/0343567 A1* | 12/2013 | Triplett | H04N 21/41407 381/77 |
| 2014/0133848 A1* | 5/2014 | Koike-Akino | H04B 10/0799 398/25 |
| 2015/0031322 A1* | 1/2015 | Twina | H04L 12/1895 455/404.1 |
| 2015/0256922 A1* | 9/2015 | Shi | H04R 1/2842 381/353 |
| 2015/0381617 A1* | 12/2015 | Jung | H04W 4/02 455/411 |
| 2015/0381787 A1* | 12/2015 | Babayev | H04M 1/271 455/563 |
| 2016/0080865 A1* | 3/2016 | He | H03G 3/20 381/96 |
| 2016/0234356 A1* | 8/2016 | Thomas | H05K 9/0069 |

* cited by examiner

RADIO ALERT SYSTEM AND METHOD

CROSS-REFERENCE TO RELATED APPLICATIONS/INCORPORATION BY REFERENCE

The present application is related to and claims priority to U.S. provisional application Ser. No. 62/167,107 filed on May 27, 2015, entitled "Radio Alert System and Method" and U.S. provisional application Ser. No. 62/174,657 filed on Jun. 12, 2015, entitled "Radio Alert System and Method." The above referenced provisional applications are hereby incorporated herein by reference in their entirety.

FIELD OF THE INVENTION

Certain embodiments of the invention relate to the field of two-way communications. More specifically, certain embodiments of the invention relate to a universal way to communicate data with limited access to the physical channel.

BACKGROUND OF THE INVENTION

Sending data over voice channels has been known at least since the development of the modem. Schemes such as sub-band signaling, cellular digital packet data, and the like are examples of using a voice channel to communicate data.

In the past, however, the voice channel was a reasonably linear one, defined by bandwidth and response. In most modern wireless devices, a vocoder is used to reduce the voice to a low bandwidth digital signal. Although the vocoder algorithms are specifically designed to minimize the perceptible distortion of voice signals, the audio path provided is nonlinear and time varying, and not suitable for typical data signals. This is a particular concern when mission critical information requires sending, as users are often relegated to manual repetition of the data verbally. If the user is distracted, incapacitated, or simply unable to reach his radio when communication is needed, severe harm may result.

While the same physical channel may be available for sending non-voice data, access to this path is often not provided outside of the device itself. Accessories needing data communications access are not always granted access to this path. Even access to basic signaling functions, such as an emergency switch, are often denied to third party accessories.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for automatically communicating data using a nonlinear, time-varying voice channel, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
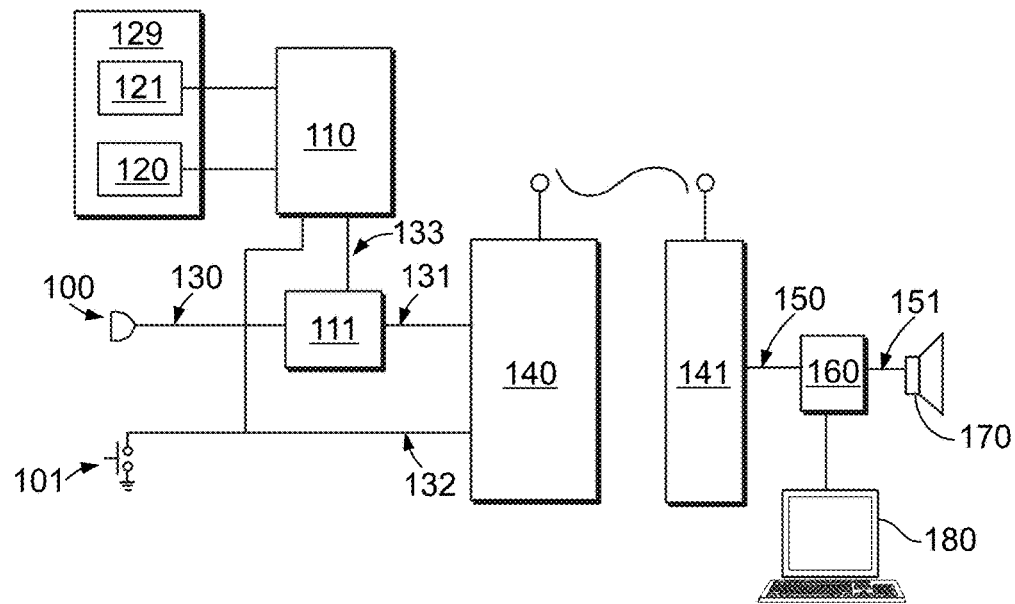
FIG. 1 is a block diagram of an exemplary system having an encoding and decoding apparatus for automatically communicating data using a nonlinear, time-varying voice channel, in accordance with an embodiment of the invention.

Certain embodiments of the invention may be found in a method and system for automatically communicating data using a nonlinear, time-varying voice channel. For example, aspects of the present invention comprise a data or alert system using a nonlinear, time-varying voice channel such as a vocoder to automatically communicate data when needed. Although the full data bandwidth may not be available in this environment, lower speed signaling can be used, especially in emergency situations. Radio devices that accept an accessory typically include a microphone input and push-to-talk (PTT) control line, even if a digital channel, or even basic status data such as emergency indication, are not offered to the accessory. With these radio devices, some amount of information may be transferred.

Aspects of the present invention provide a system and method of communicating information over a primary voice channel to provide alerts in cases where, for example, the radio is to be left unattended, a user is incapacitated, otherwise occupied, and/or personally unaware of the reported information. Various embodiments provide the technical effect of automatically reporting an injured user, an emergency situation, or any suitable data a user may normally report via voice communication.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings. It should also be understood that the embodiments may be combined, or that other embodiments may be utilized and that structural, logical and electrical changes may be made without departing from the scope of the various embodiments of the present invention. The following detailed description is, therefore, not to be taken in a limiting sense, and the scope of the present invention is defined by the appended claims and their equivalents.

As used herein, an element or step recited in the singular and proceeded with the word "a" or "an" should be understood as not excluding plural of said elements or steps, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Furthermore, the term controller, processor, or processing unit, as used herein, refers to any type of processing unit that can carry out the required calculations needed for the invention, such as single or multi-core: CPU, DSP, FPGA, ASIC or a combination thereof.

FIG. 1 is a block diagram of an exemplary system having an encoding and decoding apparatus for automatically communicating data using a nonlinear, time-varying voice channel, in accordance with an embodiment of the invention. Referring to FIG. 1, the system comprises an end-to-end encoder and decoder comprising a controller 110, audio select/mixer 111, sensor array 129, radios 140, 141, decoder 160, audio transducer 170, and device 180. If the system is to be used with a voice accessory, the system may comprise a microphone 100 for audio detection and push-to-talk (PTT) switch 101, which are included for illustrative purposes, but may be omitted in various embodiments. In a normal operating mode (i.e., when automated communication has not been initiated), the audio select block 111 may pass audio signals received from microphone 100 on line 130 to the radio microphone input on line 131. The PTT switch 101, if activated by a user, signals the radio 140 to transmit, typically grounding the PTT input on line 132.

The sensor array 129 may comprise one or more sensors 120, 121 operable to detect a condition to trigger a spontaneous data transfer. For example, the sensor(s) 120, 121 can include biometric monitors indicating the health of the user, level-sensing "man down" apparatus, remote monitoring systems, or any sensing device capable of detecting a condition. Additionally and/or alternatively, the sensor(s) 120, 121 may comprises a user activated button, trigger, switch, or any suitable user activated device for indicating an emergency situation, for example.

In various embodiments, the controller 110 may comprise suitable logic, circuitry, interfaces and/or code that may be operable to monitor the status of sensor array 129. The controller 110 may be configured to receive an indication from sensor array 129 that a condition has been detected. The controller 110 is configured to construct a modulated data packet comprising information to be transferred in response to the detected condition received from the sensor array 129 to trigger the data transfer. The data packet may include data representing the identity of the user, the cause of the transfer, and/or any suitable information while taking into account the limited bandwidth. The controller 110 may be configured to assert a PTT signal on line 132, activating the radio transmitter 140. After a short (radio dependent) delay, controller 110 signals audio mixer 111 to include the modulated signal on line 133 into the radio microphone input 131. The signaling protocol may be any modulation scheme that is transferred through the audio channel (typically interfacing at the vocoder level), and may be warble tones, DTMF, selected phonemes, or any suitable decodable representation that is tolerant of the characteristics of the voice channel.

In an exemplary embodiment, audio mixer 111 may mute or reduce the signal on mic input 130 during autonomous data transfer. In certain embodiments, the mic signal 130 and modulated signal 133 may be combined on radio mic input 131 to provide remote audio monitoring of the situation.

Still referring to FIG. 1, the radio 140 transmits the encoded data on line 131 to a second radio 141 while the PTT is asserted on 132. The audio output of the receiving radio 141 appearing on line 150 is passed to decoder 160. The decoder 160 may comprise suitable logic, circuitry, interfaces and/or code that may be operable to decode received data signals and pass the data to device 180. In various embodiments, the device 180 may comprise suitable logic, circuitry, interfaces and/or code that may be operable to log the data from the decoder 160, generate visual or audible alerts, process the decoded data internally, pass the data to a third party, or take any other appropriate action, completing the communication.

In an exemplary embodiment, decoder 160 may optionally block the audio signal to the audio transducer 170 while data is detected on the channel. Alternatively, decoder 160 may allow the audio signal to pass through to provide an audio indication of the communication.

Figure 2:
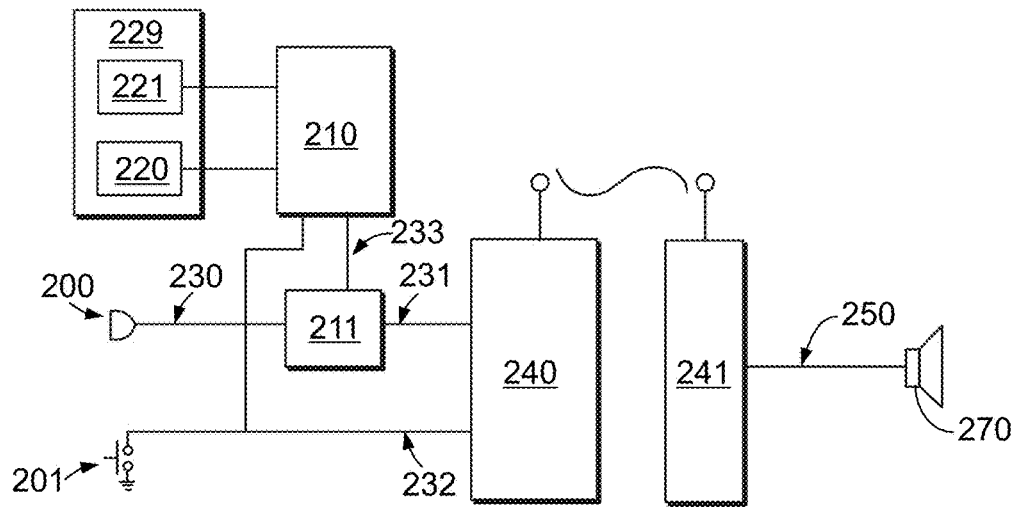
FIG. 2 is a block diagram of an exemplary system having an encoding apparatus for automatically communicating data using a nonlinear, time-varying voice channel, in accordance with an embodiment of the invention.

FIG. 2 is a block diagram of an exemplary system having an encoding apparatus for automatically communicating data using a nonlinear, time-varying voice channel, in accordance with an embodiment of the invention. Referring to FIG. 2, the system comprises a controller 210, audio select/mixer 211, sensor array 229, radios 240, 241, and audio transducer 270. In various embodiments, the embodiment illustrated in FIG. 2 may operate without a decoder. If the system is operated with a voice accessory, the system may comprise a microphone 200 for audio detection and push-to-talk (PTT) switch 201, which are included for illustrative purposes, but may be omitted in certain embodiments. In a normal operating mode (i.e., when automated communication has not been initiated), the audio select block 211 passes the audio signal from microphone 200 on line 230 to the radio microphone input on line 231. The PTT switch 201, if activated by a user, signals the radio 240 to transmit, which grounds the PTT input on line 232.

In certain embodiments, the sensor array 229 comprises one or more sensors 220, 221 operable to detect a condition to trigger a spontaneous data transfer. For example, the sensor(s) 220, 221 can include biometric monitors indicating the health of the user, level-sensing "man down" apparatus, remote monitoring systems, or any sensing device capable of detecting a condition. Additionally and/or alternatively, the sensor(s) 220, 221 may comprise a user activated button, trigger, switch, or any suitable user activated device for indicating an emergency situation, for example.

In various embodiments, the controller 210 may comprise suitable logic, circuitry, interfaces and/or code that may be operable to monitor the status of sensor array 229. The controller 210 may be configured to receive an indication from sensor array 229 that a condition has been detected. The controller 210 is configured to play or synthesize an audible alert in response to the detected condition received from the sensor array 229 to trigger the data transfer. The audible alert may take various forms including a beep, bell, klaxon, or voice clip, for example. In some embodiments, the audible alert may include information such as the identity of the user, the cause of the transfer, and/or any suitable information. The controller 210 may be configured to assert a PTT signal on line 232, activating the radio transmitter 240. After a short (radio dependent) delay, controller 210 signals audio mixer 211 to include the audible alert on line 233 into the radio microphone input 231.

In certain embodiments, audio mixer 211 may mute or reduce the signal on mic input 230 during autonomous data transfer. In various embodiments, the mic signal 230 and modulated signal 233 can be combined on radio mic input 231 to provide remote audio monitoring of the situation.

Still referring to FIG. 2, the radio 240 transmits the audible alert on line 231 to a second radio 241 while the PTT asserted on 232. The audio output of the receiving radio 241 appearing on line 250 is passed to the audio transducer 270. The audio transducer 270 may be a speaker or any suitable device for providing an audio output that may be heard and understood by an external agency, such as a dispatch operator or other radio user. Additionally and/or alternatively, various embodiments may provide a visual output of the message, such as a text message, for example.

The exemplary system for automatically communicating data using a nonlinear, time-varying voice channel of FIG. 2 shares various characteristics with the exemplary system for automatically communicating data using a nonlinear, time-varying voice channel illustrated in FIG. 1 and described above.

Aspects of the present invention provide a system and method for automatically communicating data using a nonlinear, time-varying voice channel. In accordance with various embodiments of the invention, the system comprises at least one sensor 120, 121, 129, 220, 221, 229 operable to detect a condition. The system comprises a controller 110, 210 configured to receive an indication of the detected condition from the at least one sensor 120, 121, 129, 220, 221, 229. The controller 110, 210 is configured to generate a message comprising information of the detected condition based on the received indication of the detected condition. The system comprises a radio transmitter 140, 240 configured to wirelessly transmit the generated message on the voice channel.

In a representative embodiment, the message is a modulated data packet. In various embodiments, the message is a audible alert that is one or more of played or synthesized by the controller 210. In certain embodiments, the system comprises a push-to-talk switch 101, 201. The push-to-talk switch 101, 201 and/or the controller 110, 210 are configured to assert a push-to-talk signal to activate the radio transmitter 140, 240. In a representative embodiment, the system comprises a microphone 100, 200 operable to provide audio signals for transmission if the push-to-talk signal is asserted. In various embodiments, the system comprises an audio mixer 111, 211 configured to mute or reduce the audio signals provided by the microphone 100, 200 if the radio transmitter 140, 240 is transmitting the generated message. In certain embodiments, the system comprises an audio mixer 111, 211 configured to combine the audio signals provided by the microphone 100, 200 and the generated message if the radio transmitter 140, 240 is transmitting the generated message.

In various embodiments, the at least one sensor 120, 121, 129, 220, 221, 229 is one or more of a biometric monitor, a level-sensing apparatus, and a remote monitoring system. In a representative embodiment, the at least one sensor 120, 121, 129, 220, 221, 229 is one or more of a user-activated button, switch, and trigger.

In certain embodiments, the system comprises a radio receiver 141 configured to wirelessly receive the modulated data packet transmitted by the radio transmitter 140. The system comprises a decoder 160 configured to decode the received data packet. The system comprises a device 180 configured to one or more of log the decoded data, generate one or more of a visual alert and an audible alert, and communicate the decoded data to an external device. In various embodiments, the system comprises a push-to-talk switch 101. The push-to-talk switch 101 and/or the controller 110 are operable to assert a push-to-talk signal. The system comprises a microphone 100 operable to provide audio signals for transmission if the push-to-talk signal is asserted. The system comprises an audio transducer 170 configured to one or more of block the audio signals if the modulated data packet is being transmitted by the radio transmitter 140, and generate audio in response to the audio signals.

In a representative embodiment, the system comprises a radio receiver 241 configured to wirelessly receive the audible alert transmitted by the radio transmitter 240. The system comprises an audio transducer 270 configured receive the audible alert from the radio receiver and produce audio based on the audible alert.

Various embodiments provide a method for automatically communicating data using a nonlinear, time-varying voice channel. The method comprises detecting, by at least one sensor 120, 121, 129, 220, 221, 229, a condition. The method comprises receiving, by a controller 110, 210, an indication of the detected condition from the at least one sensor 120, 121, 129, 220, 221, 229. The method comprises generating, by the controller 110, 210, a message comprising information of the detected condition based on the received indication of the detected condition. The method comprises wirelessly transmitting, by a radio transmitter 140, 240, the generated message on the voice channel.

In certain embodiments, the message is a modulated data packet. In a representative embodiment, the message is a audible alert that is one or more of played or synthesized by the controller 110, 210. In various embodiments, the method comprises asserting, by one or more of a push-to-talk switch 101, 201 and the controller 110, 210, a push-to-talk signal to activate the radio transmitter 140, 240. In certain embodiments, the method comprises providing, by a microphone 100, 200, audio signals for transmission if the push-to-talk signal is asserted. In a representative embodiment, the method comprises muting the audio signals provided by the microphone 100, 200 if the radio transmitter 140, 240 is transmitting the generated message. In various embodiments, the method comprises reducing the audio signals provided by the microphone 100, 200 if the radio transmitter 140, 240 is transmitting the generated message. In certain embodiments, the method comprises combining the audio signals provided by the microphone 100, 200 and the generated message if the radio transmitter 140, 240 is transmitting the generated message.

In a representative embodiment, the at least one sensor 120, 121, 129, 220, 221, 229 is one or more of a biometric monitor, a level-sensing apparatus, and a remote monitoring system. In various embodiments, the at least one sensor 120, 121, 129, 220, 221, 229 is one or more of a user-activated button, switch, and trigger. In certain embodiments, the method comprises wirelessly receiving, at a radio receiver 141, the modulated data packet transmitted by the radio transmitter 140. The method comprises decoding, at a decoder 160, the received data packet. The method comprises one or more of logging the decoded data, generating one or more of a visual alert and an audible alert, and communicating the decoded data to an external device. In a representative embodiment, the method comprises generating, by one or more of the controller 110 and a push-to-talk switch 101, an asserted push-to-talk signal. The method comprises providing, by a microphone 100, audio signals for transmission if a push-to-talk signal is asserted. The method comprises one or more of blocking, by an audio transducer 170, the audio signals if the modulated data packet is being transmitted by the radio transmitter 140, and generating, by the audio transducer 170, audio in response to the audio signals.

In various embodiments, the method comprises, wirelessly receiving, by a radio receiver 241, the audible alert transmitted by the radio transmitter 240. The method comprises receiving, by an audio transducer 270, the audible alert from the radio receiver 241. The method comprises producing, by the audio transducer 270, audio based on the audible alert.

As utilized herein the term "circuitry" refers to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the invention may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for automatically communicating data using a nonlinear, time-varying voice channel.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, algorithm, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What it claimed is:

1. A system configured to automatically communicate data indicative of a detected condition, the system comprising:
   at least one sensor operable to detect a condition;
   a controller configured to:
   receive an indication of the detected condition from the at least one sensor, and
   generate a message comprising information of the detected condition based on the received indication of the detected condition; and
   a radio transmitter configured to wirelessly transmit the generated message on a nonlinear, time-varying voice channel.

2. The system of claim 1, wherein the message is a modulated data packet.

3. The system of claim 2, comprising:
   a radio receiver configured to wirelessly receive the modulated data packet transmitted by the radio transmitter;
   a decoder configured to decode the received data packet; and
   a device configured to one or more of:
   log the decoded data,
   generate one or more of a visual alert and an audible alert, and
   communicate the decoded data to an external device.

4. The system of claim 3, comprising:
   a push-to-talk switch, wherein one or more of the push-to-talk switch and the controller are operable to assert a push-to-talk signal;
   a microphone operable to provide audio signals for transmission if the push-to-talk signal is asserted, and
   an audio transducer configured to one or more of:
   block the audio signals if the modulated data packet is being transmitted by the radio transmitter, and
   generate audio in response to the audio signals.

5. A push-to-talk communication device configured to automatically communicate data indicative of a detected condition, the system comprising:
   at least one sensor operable to detect a condition;
   a PTT switch configured to assert a push-to-talk signal;
   a controller configured to:
   receive an indication of the detected condition from the at least one sensor, and
   generate a data message comprising information of the detected condition based on the received indication of the detected condition,
   wherein the generated data message is an audible alert that is one or more of played or synthesized by the controller; and a radio transmitter configured to wirelessly transmit the generated data message and signals responsive to the push-to-talk signal via a nonlinear, time varying voice channel.

6. The push-to-talk communication device of claim 5, comprising a microphone operable to provide audio signals for transmission if the push-to-talk signal is asserted.

7. The push-to-talk communication device of claim 6, comprising an audio mixer configured to one or more of mute or reduce the audio signals provided by the microphone if the radio transmitter is transmitting the generated message.

8. The push-to-talk communication device of claim 6, comprising an audio mixer configured to combine the audio signals provided by the microphone and the generated message if the radio transmitter is transmitting the generated message.

9. The push-to-talk communication device of claim 5, wherein the at least one sensor is one or more of:
a biometric monitor,
a level-sensing apparatus, and
a remote monitoring system.

10. The push-to-talk communication device of claim 5, wherein the at least one sensor is one or more of a user-activated button, switch, and trigger.

11. A method for automatically communicating data using a nonlinear, time-varying voice channel, the method comprising:
detecting, by at least one sensor, a condition;
receiving, by a controller, an indication of the detected condition from the at least one sensor;
generating, by the controller, a message comprising information of the detected condition based on the received indication of the detected condition; and
wirelessly transmitting, by a radio transmitter, the generated message via a nonlinear, time-varying voice channel.

12. The method of claim 11, wherein the message is a modulated data packet.

13. The method of claim 12, comprising:
wirelessly receiving, at a radio receiver, the modulated data packet transmitted by the radio transmitter;
decoding, at a decoder, the received data packet; and
one or more of:
logging the decoded data,
generating one or more of a visual alert and an audible alert, and
communicating the decoded data to an external device.

14. The method of claim 13, comprising:
generating, by one or more of the controller and a push-to-talk switch, an asserted push-to-talk signal;
providing, by a microphone, audio signals for transmission if a push-to-talk signal is asserted, and
one or more of:
blocking, by an audio transducer, the audio signals if the modulated data packet is being transmitted by the radio transmitter, and
generating, by the audio transducer, audio in response to the audio signals.

15. A method for automatically communicating data indicative of a detected condition via a push-to-talk communication device, the method comprising:
detecting, by at least one sensor, a condition;
receiving, by a controller, an indication of the detected condition from the at least one sensor;
generating, by the controller, a message comprising information of the detected condition based on the received indication of the detected condition, wherein the message is an audible alert that is one or more of played or synthesized by the controller; and
wirelessly transmitting, by a radio transmitter, the generated message via a nonlinear, time-varying voice channel of the push-to-talk device.

16. The method of claim 15, comprising asserting, by one or more of a push-to-talk switch and the controller, a push-to-talk signal to activate the radio transmitter.

17. The method of claim 16, comprising providing, by a microphone, audio signals for transmission if the push-to-talk signal is asserted.

18. The method of claim 17, comprising one of:
muting the audio signals provided by the microphone if the radio transmitter is transmitting the generated message,
reducing the audio signals provided by the microphone if the radio transmitter is transmitting the generated message, or
combining the audio signals provided by the microphone and the generated message if the radio transmitter is transmitting the generated message.

19. The method of claim 15, wherein the at least one sensor is one or more of:
a biometric monitor,
a level-sensing apparatus, and
a remote monitoring system.

20. The method of claim 15, wherein the at least one sensor is one or more of a user-activated button, switch, and trigger.

21. The method of claim 15, comprising:
wirelessly receiving, by a radio receiver, the audible alert transmitted by the radio transmitter;
receiving, by an audio transducer, the audible alert from the radio receiver; and
producing, by the audio transducer, audio based on the audible alert.

* * * * *